Nov. 10, 1953  L. BESS  2,659,052
TRANSMISSION LINE DELAY NETWORK
Filed Sept. 14, 1945
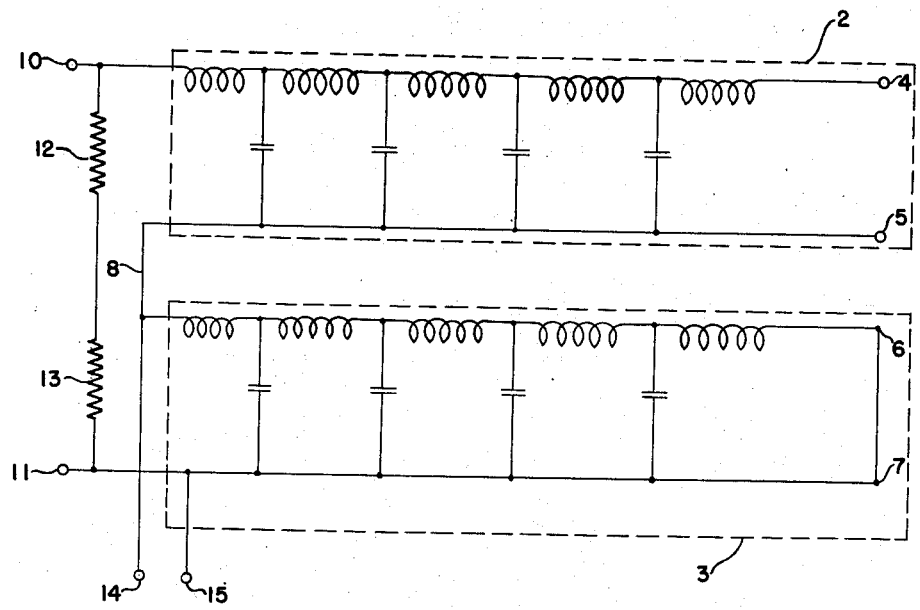
INVENTOR.
LEON BESS
BY William D. Hall.
ATTORNEY Patented Nov. 10, 1953

2,659,052

UNITED STATES PATENT OFFICE 2,659,052

TRANSMISSION LINE DELAY NETWORK

Leon Bess, Boston, Mass., assignor, by mesne assignments, to the United States of America as represented by the Secretary of War Application September 14, 1945, Serial No. 616,383

5 Claims. (Cl. 333—29)

The present invention relates to a transmission line, and it relates more particularly to a transmission line adapted to delay signals of electrical energy for predetermined periods of time.

In various electrical circuits, it is often desirable to have one signal such as a pulse of electrical energy, occur a definite time later than some other signal. On the other hand, it may be desirable to delay signals of electrical energy for predetermined periods of time so that they can readily be compared to other electrical signals occurring at a predeterminable time later.

It is well known that if signals of electrical energy are applied to a transmission line having a certain length, a definite amount of time passes before the signal is received at the other end, that is, the line delays the applied signal for a certain period of time. As a transmission line has inductance, resistance, capacitance and leakage reactance, an artificial transmission line built of inductances, resistances and capacitances may be constructed. Such a line may consist of a number of individual T, "π," or L sections, each section having a predetermined amount of delay. Generally speaking, the amount of delay that can be obtained in such an artificial transmission line is dependent upon the number of individual sections therein.

It is an object of the present invention to provide a delay type transmission line wherein an input pulse may be delayed, and wherein two output pulses may be obtained for each inlet pulse.

It is another object of the present invention to provide a novel artificial transmission line, comprising two series connected component transmission lines, which is adapted to delay a signal for a period twice that which could be obtained with a single line.

The invention may be more fully understood, however, by reference to the following detailed description when taken into consideration with the accompanying drawing wherein the single figure shows an artificial transmission line of the character desired.

Referring now to the figure, the complete artificial transmission line may be considered as consisting of a component transmission line 2 and a similar component transmission line 3 where the length of time it takes for a signal to travel down line 2 is exactly equal to the length of time it takes a signal to travel down line 3. Terminals 4 and 5 of component line 2 are left open-circuited, whereas similar terminals 6 and 7 of component line 3 are short-circuited. The two component lines are then connected in series by means of connection 8.

Consider now a pulse of electrical energy having a generally rectangular waveform as being applied to input terminals 10 and 11. Both component line 2 and component line 3 should be terminated with their respective characteristic impedances and as the two lines are similar, their respective characteristic impedances are equal. Thus a proper termination of line 2 is provided by resistance 12 and a proper termination for line 3 is provided by resistance 13. Inasmuch as the two component lines are connected in series, resistance 12 and 13 are likewise connected in series. The reason for this termination is readily understood when it is recalled that a rectangular pulse may be considered as consisting of an infinite number of waves of different frequencies and suitable amplitudes. It is therefore desirable to have the transmission line independent of the frequency of the signal carried thereby and this is accomplished when the line is infinitely long, or when it is of finite length and terminated in its characteristic impedance.

As the two component lines 2 and 3 are connected in series the rectangular pulse applied to input terminals 10 and 11 divides; half going down component transmission line 2 and the other half going down component transmission line 3. A predeterminable period of time δ after the pulse is applied to input terminals 10 and 11, the pulse travelling down component line 2 reaches terminals 4 and 5.

Due to terminals 4 and 5 being open circuited, the pulse signal is reflected without a change of polarity and returns back down line 2 toward the input end. As the length of time it takes the pulse to travel from input terminals 10 and 11 down component transmission line 2 is equal to δ, the reflected pulse is returned to the input end of the line and is developed across resistance 12 after an interval of time equal to 2δ.

The other half of the input pulse applied to input terminals 10 and 12 travels down component transmission line 3, and after a time δ reaches short circuited terminals 6 and 7. The signal is reflected therefrom with a change in polarity and travels back toward the input end of the line. This reversed polarity signal is developed across resistance 13 and likewise appears at output terminals 14 and 15 at a time 2δ after the input pulse was applied to input terminals 10 and 11.

Thus in view of the foregoing, it can be seen that two pulses of equal amplitude are returned to the input end of each line after an interval 2δ. The pulses are of opposite polarity however and hence there is no net voltage across the characteristic impedance terminations (resistances) 12 and 13. Because of the zero net voltage the pulses are not dissipated in these impedances and hence are again reflected down the component lines. As before, the pulse travelling down component line 2 is again reflected without a change in polarity, whereas the pulse travelling down component line 3 is again reflected from short circuited terminals 6 and 7 with a change in polarity.

The two reflected signals appearing at the input ends of component lines 2 and 3 respectively are now of the same polarity and hence combine across resistances 12 and 13 to produce a signal pulse similar to that originally applied to the input terminals 10 and 11. The total time interval between the occurrence of said signal pulse and the applied pulse corresponds to a time interval 4δ. A signal appearing at terminals 10 and 11 a period 4δ after the input signal is applied to said terminals, also appears at output terminals 14 and 15. As the resistances 12 and 13 provide a proper termination for the two component transmission lines the signals are absorbed thereby and no further reflections occur until the next input pulse is applied. Two resistances 12 and 13 are shown for purposes of description only and it is evident that they may be replaced by a single resistance having value equal to the combined values of resistances 13 and 14.

In view of the foregoing description it is evident that if, for example, a positive pulse is applied to input terminals 10 and 11 a negative pulse appears at output terminals 14 and 15 a time 2δ later and at a time corresponding to 4δ (after the original pulse is applied) a positive pulse appears at terminals 14 and 15. Thus for each input pulse applied to input terminals 10 and 11 two output pulses are obtained at terminals 14 and 15. If desired terminals 4 and 5 may be short circuited and terminals 6 and 7 open circuited, and in such an instance two output pulses are obtained at output terminals 14 and 15 (at a time corresponding to 2δ and 4δ respectively) where said pulses are all of the same polarity as the input pulse.

Considering an artificial transmission line comprising lumped inductances and capacitances, it can be seen that in the present instance one side of the line may be defined as an "inductance side." The other side consisting of the common connection between the parallel connected capacitances may be defined as the "capacitance side." The term series connection as used in the specification and claims refers to connecting two unlike sides together as exemplified by connecting the "capacitance side" of one transmission line to the "inductance side" of a second transmission line.

It is to be understood that the term transmission line as used in the specification and claims may comprise an actual transmission line or an artificial transmission line made up of lumped inductances and capacitances.

It is to be further understood that a delay type transmission line of the character described is also responsive to signals of electrical energy other than pulse type signals of electrical energy.

While there has been here described one embodiment of the present invention it will be manifest to those skilled in the art that various changes and modifications may be made therein without departing from the invention. It is therefore aimed in the appended claims to cover all such changes and modifications as fall within the spirit and scope of the invention.

I claim:

1. A transmission line adapted to provide two output signals of electrical energy for each input signal applied thereto, each signal having a predeterminable time interval between them, said transmission line including a first component transmission line open-circuited at one end, a second and similar component transmission line connected in series with said first component transmission line, said second component transmission line being short-circuited at one end, a resistance across said serially connected lines, said resistance being substantially equal to the sum of the characteristic impedances of each component transmission line, means for impressing a signal across said serially connected component transmission lines, and means for obtaining an output from across one of said component lines.

2. A transmission line adapted to delay signals of electrical energy for a predeterminable period of time, said transmission line including a first component transmission line open-circuited at one end, a second and similar component transmission line connected in series with said first component transmission line, said second component transmission line being short-circuited at one end, a resistance across said serially connected component lines said resistance being substantially equal to the sum of the characteristic impedances of each component transmission line, means for applying a signal across said serially connected component transmission lines, and means for obtaining a delayed signal a predeterminable time later, across said serially connected component transmission lines.

3. A transmission line according to claim 2, including means for obtaining an output from across one of said component transmission lines.

4. A device comprising a first delay means which reflects electrical signals applied to the input thereof back to said input without a change in polarity after a time interval determined by the delay characteristic of said first delay means, a second delay means, having the same delay characteristic as said first delay means, which reflects electrical signals applied to the input thereof back to said input with a change in polarity after said time interval, means for serially connecting said first delay means and said second delay means, an impedance connected across the input of said serially-connected delay means, and means for applying an electrical signal across the input of said serially-connected delay means, whereby a first signal having the same polarity as said applied signal is derived across the input of said first delay means after said given time interval, a second signal having the same polarity as said applied signal is derived across the input of said first delay means after twice said given time interval, a third signal having an opposite polarity from said applied signal is derived across the input of said second delay means after said given time interval, a fourth signal having the same polarity as said applied signal is derived across the input of said second delay means after twice said given time interval, and a fifth signal having the same polarity as said applied signal is derived across the input of said serially-connected delay means atfer twice said given time interval.

5. In combination, a pair of delay lines having equal delay characteristics and equal characteristic impedances, each of said lines having a pair of input terminals and a pair of output terminals, means connecting said input terminals in series, one of said lines having its output terminals open-circuited, the other of said lines having its output terminals short-circuited, and a resistance having a value equal to the sum of the characteristic impedances of both said lines connected in parallel with said input terminals.

LEON BESS.

References Cited in the file of this patent

UNITED STATES PATENTS

| Number | Name | Date |
| --- | --- | --- |
| 1,781,469 | Mason | Nov. 11, 1930 |
| 1,975,709 | Blumlein | Oct. 2, 1934 |
| 2,145,332 | Bedford | Jan. 31, 1939 |
| 2,188,970 | Wilson | Feb. 6, 1940 |
| 2,420,302 | Darlington | May 13, 1947 |